United States Patent
Zhang et al.

(10) Patent No.: US 11,984,744 B2
(45) Date of Patent: May 14, 2024

(54) BATTERY CHARGING METHOD, APPARATUS, AND MEDIUM

(71) Applicant: BEIJING XIAOMI MOBILE SOFTWARE CO., LTD., Beijing (CN)

(72) Inventors: Jinlong Zhang, Beijing (CN); Xueyun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 383 days.

(21) Appl. No.: 16/844,862

(22) Filed: Apr. 9, 2020

(65) Prior Publication Data

US 2021/0091584 A1 Mar. 25, 2021

(30) Foreign Application Priority Data

Sep. 23, 2019 (CN) .......................... 201910900483.3

(51) Int. Cl.
*H02J 7/00* (2006.01)
(52) U.S. Cl.
CPC .......... *H02J 7/0049* (2020.01); *H02J 7/0071* (2020.01)
(58) Field of Classification Search
CPC ............................. H02J 7/0049; H02J 7/0071
See application file for complete search history.

(56) References Cited

U.S. PATENT DOCUMENTS 3,217,143 A * 11/1965 Merz ...................... H03K 21/00
377/111
5,537,023 A * 7/1996 Hanselmann ..... H02J 7/007184
320/156
10,283,820 B2 5/2019 Sugeno et al.
(Continued)

FOREIGN PATENT DOCUMENTS

CN 1527434 A 9/2004
CN 103579703 A 2/2014
(Continued)

OTHER PUBLICATIONS

Wang J; CN103762391A translated description; Feb. 2019 (Year: 2019).*

(Continued)

*Primary Examiner* — Drew A Dunn
*Assistant Examiner* — Pamela J Jeppson
(74) *Attorney, Agent, or Firm* — Syncoda LLC; Feng Ma

(57) ABSTRACT

A battery charging method includes: determining whether a present charging cycle satisfies a floating charging condition when a first condition is satisfied, the first condition being that in a case where battery capacity is greater than a set capacity, a duration of continuous charging is greater than a set threshold; and charging using a set floating charging mode after determining that the present charging cycle satisfies the floating charging condition. As such, the battery capacity during the charging process is detected in real time. In a case where the battery capacity is greater than the set capacity, the duration of continuous charging is greater than the set threshold and the present charging cycle satisfies the floating charging condition, the floating charging mode is used in time, such that batteries are prevented from dangerous situations such as bulging, expansion and explosion, and the safety of battery charging is improved.

14 Claims, 6 Drawing Sheets

--- setting a first parameter of a first charging cycle satisfying the first condition to be an initial value; updating the first parameter according to the difference between charging cycle numbers of adjacent charging cycles satisfying the first condition; increasing the value of the first parameter when the difference between the charging cycle numbers is less than or equal to the set value; and, setting the first parameters to be a minimum value or decreasing the value of the first parameter when the difference is greater than the set value — S150 the determining that the latest N charging cycles satisfying the first condition satisfy a second condition includes: the value of the first parameter being greater than or equal to a set parameter value — S151

(56) References Cited

U.S. PATENT DOCUMENTS

| | | | |
|---|---|---|---|
| 2004/0130294 A1* | 7/2004 | Ng | H02J 7/0086 320/128 |
| 2004/0222768 A1* | 11/2004 | Moore | H02J 7/0069 320/128 |
| 2012/0139482 A1* | 6/2012 | Zhang | H02J 7/0071 320/153 |
| 2016/0197506 A1 | 7/2016 | Abiru et al. | |
| 2020/0169107 A1 | 5/2020 | Joshi et al. | |

FOREIGN PATENT DOCUMENTS

| | | | | |
|---|---|---|---|---|
| CN | 103762391 A | * | 4/2014 | ............ H01M 10/44 |
| CN | 107636870 A | | 1/2018 | |
| CN | 107666167 A | | 2/2018 | |
| CN | 109494843 A | | 3/2019 | |
| CN | 110085934 A | | 8/2019 | |
| JP | 2008067420 A | | 3/2008 | |
| WO | 2014098875 A1 | | 6/2014 | |
| WO | WO-2014098875 A1 | * | 6/2014 | ............... B60L 1/00 |
| WO | WO-2019031811 A1 | * | 2/2019 | .......... H01M 10/425 |

OTHER PUBLICATIONS

Cranz "Your Phone is a Ticking Time Bomb", Sep. 14, 2016, https://www.gizmodo.com.au/2016/09/your-phone-is-a-ticking-time-bomb/ (Year: 2016).*

Extended European Search Report in Application No. 20173407, mailed on Nov. 4, 2020.

China first office action and search report in Application No. 201910900483.3, mailed on Nov. 1, 2022.

European office action in Application No. 20173407.6, mailed on Sep. 8, 2022.

Topic: Floating charge voltage and balanced charge of lead-acid batteries, 1994-2022 China Academic Journal Electronic Publishing House, http://www.cnki.net.

* cited by examiner constant-voltage charging a battery with a first charging voltage, the first charging voltage being less than an initial constant-voltage charging voltage which is in a case where the floating charging condition is not satisfied — S121

FIG. 4 determining that the latest N charging cycles satisfying the first condition satisfy a second condition, wherein N is greater than a set number of times — S111

FIG. 5 among the latest N charging cycles satisfying the first condition, the difference between charging cycle numbers of each pair of adjacent charging cycles satisfying the first condition is less than or equal to a set value — S130

FIG. 6

```
┌─────────────────────────────────────────────────────────────┐
│ the increasing the value of the first parameter is increasing the value │
│  of the first parameter by a preset variation; and, the decreasing the │
│  value of the first parameter is subtracting the preset variation from │
│           the value of the first parameter                  │
└─────────────────────────────────────────────────────────────┘ S152
                              │
┌─────────────────────────────────────────────────────────────┐
│ the increasing the value of the first parameter is increasing the value │
│    of the first parameter by a product of the preset variation and a │
│          weight; and, the decreasing the value of the first parameter is │
│    subtracting the product of the preset variation and the weight from │
│  the value of the first parameter, wherein the weight is a fixed value, │
│ or the weight is a variable related to the occurrence sequence number │
│       of the charging cycle satisfying the first condition   │
└─────────────────────────────────────────────────────────────┘ S153
```

FIG. 9

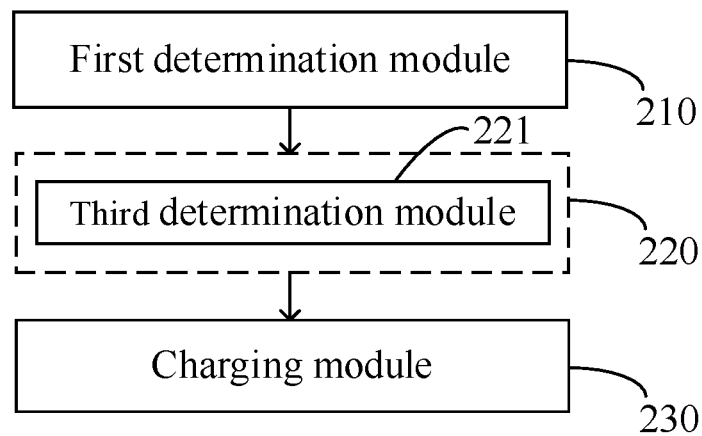

FIG. 10

BATTERY CHARGING METHOD, APPARATUS, AND MEDIUM

CROSS-REFERENCE TO RELATED APPLICATION

The present application claims priority to Chinese Patent Application No. 201910900483.3 filed on Sep. 23, 2019, the disclosure of which is hereby incorporated by reference in its entirety.

BACKGROUND

In some applications, some electronic devices may need to be in a charging state for a long period of time and not in the charging state only for a short period of time. In such an application scenarios, after the battery of the device is charged fully, the terminal is still connected to the charger. In this case, the battery of the device is always in a State of Charge (SOC) and a high voltage floating charged state. The device in such a scenario is likely to cause serious problems such as battery bulging, expansion and explosion in a high-temperature environment.

SUMMARY

The present disclosure relates generally to the technical field of electricity storage, and more specifically to a battery charging method, apparatus and medium.

In accordance with a first aspect of the embodiments of the present disclosure, a battery charging method is provided, including steps of:
  determining whether a present charging cycle satisfies a floating charging condition when a first condition is satisfied, the first condition being that in a case where battery capacity is greater than a set capacity, a duration of continuous charging is greater than a set threshold; and
  charging using a set floating charging mode after determining that the present charging cycle satisfies the floating charging condition
  Wherein the charging using a set floating charging mode includes:
    constant-voltage charging the battery with a first charging voltage, the first charging voltage being less than an initial constant-voltage charging voltage, the initial constant-voltage charging voltage being in a case where the floating charging condition is not satisfied.
  Wherein the determining that the present charging cycle satisfies the floating charging condition includes:
  determining that the latest N charging cycles satisfying the first condition satisfy a second condition, wherein N is greater than a set number of times.
  Wherein the determining that the latest N charging cycles satisfying the first condition satisfy a second condition includes:
    among the latest N charging cycles satisfying the first condition, the difference between charging cycle numbers of adjacent charging cycles satisfying the first condition is less than or equal to a set value.
  Wherein the determining that the latest N charging cycles satisfying the first condition satisfy a second condition includes:
    the number of groups of adjacent charging cycles satisfying the first condition and satisfying a third condition is greater than the product of N−1 and a first ratio, the first ratio being greater than 0.5 and less than 1; and the third condition is that the difference between charging cycle numbers of adjacent charging cycles satisfying the first condition is less than or equal to the set value.
  Wherein the method further includes steps of:
    when the floating charging condition is not satisfied, setting a first parameter of a first charging cycle satisfying the first condition to be an initial value; updating the first parameter according to the difference between charging cycle numbers of adjacent charging cycles satisfying the first condition; increasing the value of the first parameter when the difference in charging cycle number is less than or equal to the set value; and, setting the first parameters to be a minimum value or decreasing the value of the first parameter when the difference is greater than the set value; and
  the determining that the latest N charging cycles satisfying the first condition satisfy a second condition includes: the value of the first parameter is greater than or equal to a set parameter value.
  Wherein the increasing the value of the first parameter is increasing the value of the first parameter by a preset variation; and, the decreasing the value of the first parameter is subtracting the preset variation from the value of the first parameter.
  Wherein the increasing the value of the first parameter is increasing the value of the first parameter by a product of the preset variation and a weight; and, the decreasing the value of the first parameter is subtracting the product of the preset variation and the weight from the value of the first parameter, wherein the weight is a fixed value, or the weight is a variable related to the occurrence sequence number of the charging cycle satisfying the first condition.

In accordance with a second aspect of the embodiments of the present disclosure, a battery charging apparatus is provided, including:
  a processor; and
  a memory configured to store instructions executable for the processor that, when executed by the processor, causes the processor to:
  determine whether a first condition is satisfied, the first condition being that in a case where a battery capacity is greater than a set capacity, the duration of continuous charging is greater than a set threshold;
  determine whether a present charging cycle satisfies a floating charging condition when the first condition is satisfied; and
  charge using a set floating charging mode after the second determination module determines that the present charging cycle satisfies the floating charging condition.
  Wherein the instructions further cause the processor to:
  charge using the set floating charging mode in the following way: constant-voltage charging a battery with a first charging voltage, the first charging voltage being less than an initial constant-voltage charging voltage, the initial constant-voltage charging voltage being in a case where the floating charging condition is not satisfied.
  Wherein the instructions further cause the processor to:
  determine that the present charging cycle satisfies the floating charging condition in the following way: determining that the latest N charging cycles satisfying the first condition satisfy a second condition, wherein N is greater than a set number of times.

Wherein the determining that the latest N charging cycles satisfying the first condition satisfy a second condition includes:

among the latest N charging cycles satisfying the first condition, the difference between charging cycle numbers of adjacent charging cycles satisfying the first condition is less than or equal to a set value.

Wherein the determining that the latest N charging cycles satisfying the first condition satisfy a second condition includes:

the number of groups of adjacent charging cycles satisfying the first condition and satisfying a third condition is greater than the product of N−1 and a first ratio, the first ratio being greater than 0.5 and less than 1; and the third condition is that the difference between charging cycle numbers of adjacent charging cycles satisfying the first condition is less than or equal to the set value.

Wherein the instructions further cause the processor to:

set a first parameter of a first charging cycle satisfying the first condition to be an initial value when the floating charging condition is not satisfied; and update the first parameter according to the difference between charging cycle numbers of adjacent charging cycles satisfying the first condition, increase the value of the first parameter when the difference in charging cycle number is less than or equal to the set value, and set the first parameters to be a minimum value or decrease the value of the first parameter when the difference is greater than the set value; and the latest N charging cycles satisfying the first condition satisfy a second condition includes: the value of the first parameter is greater than or equal to a set parameter value.

Wherein, the increasing the value of the first parameter is increasing the value of the first parameter by a preset variation; and, the decreasing the value of the first parameter is subtracting a preset variation from the value of the first parameter.

Wherein, the increasing the value of the first parameter is increasing the value of the first parameter by a product of the preset variation and a weight; and, the decreasing the value of the first parameter is subtracting the product of the preset variation and the weight from the value of the first parameter, wherein the weight is a fixed value, or the weight is a variable related to the occurrence sequence number of the charging cycle satisfying the first condition.

In accordance with a third aspect of the embodiments of the present disclosure, provided is a non-transitory computer-readable storage medium storing instructions that, when executed by a processor of a mobile terminal, enable the mobile terminal to execute a battery charging method, the method including operations of:

determining whether a present charging cycle satisfies a floating charging condition when a first condition is satisfied, the first condition being that in a case where battery capacity is greater than a set capacity, the duration of continuous charging is greater than a set threshold; and charging using a set floating charging mode after determining that the floating charging condition is satisfied.

It should be understood that the foregoing general description and the following detailed description are merely exemplary and explanatory, and not intended to limit the present disclosure.

BRIEF DESCRIPTION OF THE DRAWINGS

The accompanying drawings herein, which are incorporated into and constitute a part of the disclosure, illustrate embodiments consistent with the present disclosure, and together with the specification, serve to explain the principles of various embodiments the present disclosure.

FIG. 4 is a supplemental flowchart of a battery charging method according to an exemplary embodiment;

FIG. 5 is a supplemental flowchart of a battery charging method according to an exemplary embodiment;

FIG. 6 is a supplemental flowchart of a battery charging method according to an exemplary embodiment;

FIG. 9 is a supplemental flowchart of a battery charging method according to an exemplary embodiment;

FIG. 10 is a structure diagram of a battery charging apparatus according to an exemplary embodiment.

DETAILED DESCRIPTION

Figure 1:
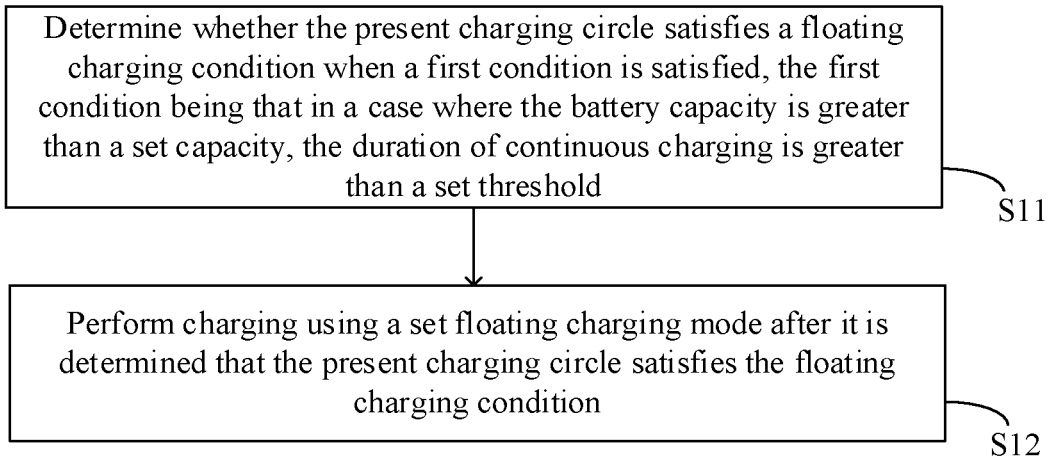
FIG. 1 is a flowchart of a battery charging method according to an exemplary embodiment.

Exemplary embodiments will be described in detail herein, and examples in the exemplary embodiments are shown in the accompanying drawings. When the accompanying drawings are involved in the following description, unless otherwise indicated, identical reference numerals in different accompanying drawings indicate identical or similar elements. The implementations described in the following exemplary embodiments do not represent all implementations consistent with the present disclosure. Instead, the implementations are merely examples of apparatuses and methods consistent with some aspects of the present disclosure as described in the appended claims.

FIG. 1 is a flowchart of a battery charging method according to an exemplary embodiment. The method includes the following steps.

Step S11: When a first condition is satisfied, it is determined whether the present charging cycle satisfies a floating charging condition, the first condition being that in a case where the battery capacity is greater than a set capacity, the duration of continuous charging is greater than a set threshold.

Step S12: The battery is charged using a set floating charging mode after it is determined that the present charging cycle satisfies the floating charging condition.

The set capacity and the set threshold in the first condition may be set according to the practical situation and experience during initial setting, or may be further adjusted as required in the subsequent use. Generally, the set capacity is 90% to 98%, and the set threshold is 0.5 to 2 h. For example, the first condition may be set as follows: in a case where the battery capacity is greater than 96% of the total battery capacity, the duration of continuous charging is greater than 1 h.

In this method, the battery capacity during the charging process is detected in real time. In a case where the battery capacity is greater than the set capacity, when the duration of continuous charging is greater than the set threshold and the present charging cycle satisfies the floating charging condition, the floating charging mode is used in time, so that batteries are prevented from dangerous situations such as bulging, expansion and explosion, and the safety of battery charging is improved.

FIG. 4 is a supplemental flowchart of a battery charging method according to an exemplary embodiment. In the step S12, the charging in a set floating charging mode includes: step S121: constant-voltage charging a battery with a first charging voltage, the first charging voltage being less than an initial constant-voltage charging voltage which is in a case where the floating charging condition is not satisfied.

In this embodiment, the charging voltage is reduced in the floating charging mode, that is, the battery is charged with a constant voltage that is less than the charging voltage in a non-floating charging mode, so that batteries are prevented from dangerous situations such as bulging, expansion and explosion, and the safety of battery charging is improved.

FIG. 5 is a supplemental flowchart of a battery charging method according to an exemplary embodiment. In the step S11, the determining that the present charging cycle satisfies the floating charging condition includes: step S111: determining that the latest N charging cycles satisfying the first condition satisfy a second condition, wherein N is greater than a set number of times. Moreover, when the latest N charging cycles satisfying the first condition do not satisfy the second condition, the present charging cycle does not satisfy the floating charging condition.

The second condition involves the charging cycle numbers of adjacent charging cycles satisfying the first condition, so that the time to enable the floating charging mode is a more reasonable time to enable the floating charging mode, and the time is determined after the charging usage of the battery is taken into consideration.

When the present charging cycle satisfies the first condition, it can be considered that the user still performs continuous charging for a long period of time after the battery is fully charged. When the latest N charging cycles satisfying the first condition satisfy the second condition, it is generally considered that the user frequently performs the continuous charging action after the battery is fully charged. In this case, the battery can be better protected if entering the floating charging mode, and the potential safety hazards caused by continuous high-voltage charging after the battery is fully charged are avoided.

Figure 7:
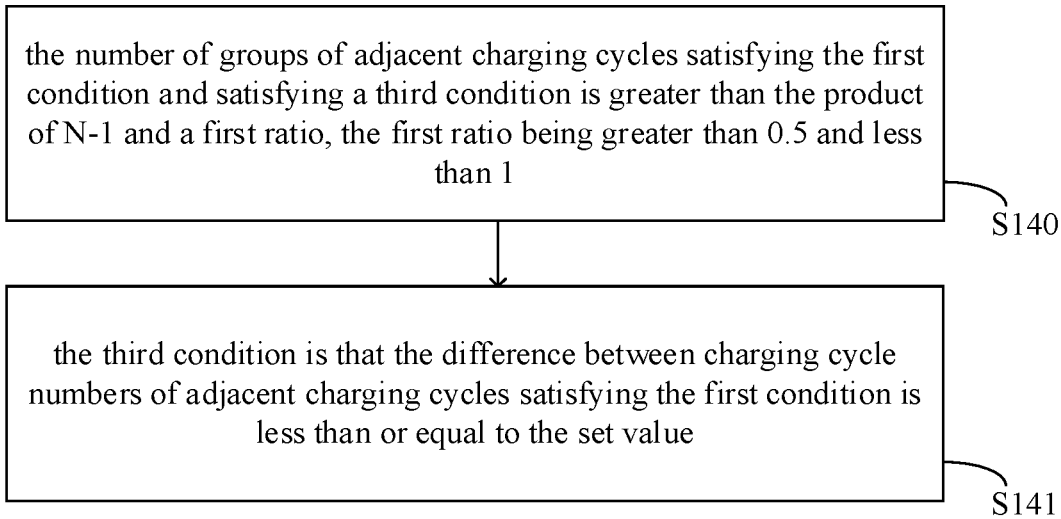
FIG. 7 is a supplemental flowchart of a battery charging method according to an exemplary embodiment.
Figure 8:
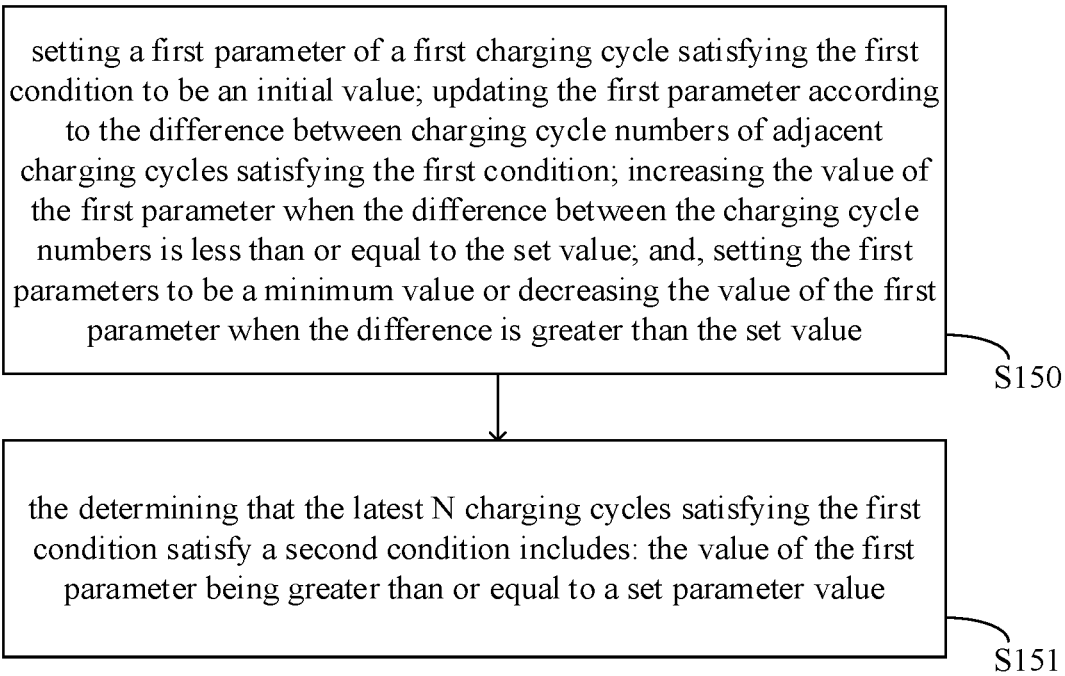
FIG. 8 is a supplemental flowchart of a battery charging method according to an exemplary embodiment.

FIG. 6 is a supplemental flowchart of a battery charging method according to an exemplary embodiment FIG. 7 is a supplemental flowchart of a battery charging method according to an exemplary embodiment FIG. 8 is a supplemental flowchart of a battery charging method according to an exemplary embodiment and FIG. 9 is a supplemental flowchart of a battery charging method according to an exemplary embodiment. The determining that the latest N charging cycles satisfying the first condition satisfy a second condition includes the following approaches.

Approach 1

Step S130: Among the latest N charging cycles satisfying the first condition, the difference between charging cycle numbers of each pair of adjacent charging cycles satisfying the first condition is less than or equal to a set value.

For example:

The set value is 5. The set number of times is 8. In the non-floating charging mode, there are latest 9 charging cycles satisfying the first condition.

The difference between the charging cycle number corresponding to the second charging cycle satisfying the first condition and the charging cycle number corresponding to the first charging cycle satisfying the first condition is 4.

The difference between the charging cycle number corresponding to the third charging cycle satisfying the first condition and the charging cycle number corresponding to the second charging cycle satisfying the first condition is 5.

The difference between the charging cycle number corresponding to the fourth charging cycle satisfying the first condition and the charging cycle number corresponding to the third charging cycle satisfying the first condition is 2.

The other charging cycles are similarly defined.

For example, the difference between the charging cycle number corresponding to the ninth charging cycle satisfying the first condition and the charging cycle number corresponding to the eighth charging cycle satisfying the first condition is 2.

All of the differences between charging cycle numbers of adjacent charging cycles satisfying the first condition are less than or equal to the set value.

In this way, each of the difference between charging cycle numbers of adjacent charging cycles satisfying the first condition is small. It is indicated that, during the battery charging process, charging cycles satisfying the first condition occur very frequently, so that the hazard index of battery charging increases continuously, and it is necessary to enter the floating charging mode in time.

Approach 2:

The determining that the latest N charging cycles satisfying the first condition satisfy a second condition includes:

step S140: the number of groups of adjacent charging cycles satisfying the first condition and satisfying a third condition is greater than the product of N−1 and a first ratio, the first ratio being greater than 0.5 and less than 1; and step S141: the third condition is that the difference between charging cycle numbers of adjacent charging cycles satisfying the first condition is less than or equal to the set value.

Each pair of charging cycles satisfying the third condition constitutes one group, and the number of groups refers to the number of pairs of two adjacent charging cycles satisfying the third condition.

The following is an example.

The set value is 5. The set number of times is 8. In the non-floating charging mode, there are latest 9 charging cycles satisfying the first condition.

The difference between the charging cycle number corresponding to the second charging cycle satisfying the first condition and the charging cycle number corresponding to the first charging cycle satisfying the first condition is 4.

The difference between the charging cycle number corresponding to the third charging cycle satisfying the first condition and the charging cycle number corresponding to the second charging cycle satisfying the first condition is 5.

The difference between the charging cycle number corresponding to the fourth charging cycle satisfying the first condition and the charging cycle number corresponding to the third charging cycle satisfying the first condition is 2.

The difference between the charging cycle number corresponding to the fifth charging cycle satisfying the first condition and the charging cycle number corresponding to the fourth charging cycle satisfying the first condition is 8.

The other charging cycles are similarly defined.

For example, the difference between the charging cycle number corresponding to the ninth charging cycle satisfying the first condition and the charging cycle number corresponding to the eighth charging cycle satisfying the first condition is 2.

There are seven groups of adjacent charging cycles satisfying the first condition and satisfying the third condition, which is greater than 0.5 times the difference (8) between 1 and the total number of occurrences of charging cycles satisfying the first condition. It can be considered that one pair of adjacent charging cycles satisfying the first condition but not satisfying the third condition is an accidental event, and the charging cycles satisfying the first condition generally occur frequently during the whole charging process.

In this way, in the non-floating charging mode, although not all adjacent charging cycles satisfying the first condition will satisfy the third condition, most of adjacent charging cycles satisfying the first condition satisfy the third condition. It is indicated that, charging cycles satisfying the first condition have already occurred frequently during the battery charging process, so that the hazard index of battery charging increases continuously and it is necessary to enter the floating charging mode in time.

Approach 3:

The method further includes steps of:

step S150: setting a first parameter of a first charging cycle satisfying the first condition to be an initial value; updating the first parameter according to the difference between charging cycle numbers of adjacent charging cycles satisfying the first condition; increasing the value of the first parameter when the difference between the charging cycle numbers is less than or equal to the set value; and, setting the first parameters to be a minimum value or decreasing the value of the first parameter when the difference is greater than the set value; and step S151: the determining that the latest N charging cycles satisfying the first condition satisfy a second condition includes: the value of the first parameter being greater than or equal to a set parameter value.

Wherein, the way to update the first parameter is specifically:

step S152: the increasing the value of the first parameter is increasing the value of the first parameter by a preset variation; and, the decreasing the value of the first parameter is subtracting the preset variation from the value of the first parameter;

or, step S153: the increasing the value of the first parameter is increasing the value of the first parameter by a product of the preset variation and a weight; and, the decreasing the value of the first parameter is subtracting the product of the preset variation and the weight from the value of the first parameter, wherein the weight is a fixed value, or the weight is a variable related to the occurrence sequence number of the charging cycle satisfying the first condition.

Example 1

In this example, the fixed preset variation is used in the process of updating the first parameter.

The set value is 5. The initial value of the first parameter is 1. The preset variation is 1. The set parameter value is 8. In the non-floating charging mode, there are latest 9 charging cycles satisfying the first condition.

After the first charging cycles satisfying the first condition occur, the value of the first parameter is set as 1.

The difference between the charging cycle number corresponding to the second charging cycle satisfying the first condition and the charging cycle number corresponding to the first charging cycle satisfying the first condition is 4 (which is less than the set value), the value of the first parameter is increased by 1, and the value of the first parameter is updated to 2.

The difference between the charging cycle number corresponding to the third charging cycle satisfying the first condition and the charging cycle number corresponding to the second charging cycle satisfying the first condition is 5 (which is equal to the set value), the value of the first parameter is increased by 1, and the value of the first parameter is updated to 3.

The difference between the charging cycle number corresponding to the fourth charging cycle satisfying the first condition and the charging cycle number corresponding to the third charging cycle satisfying the first condition is 4 (which is less than the set value), the value of the first parameter is increased by 1, and the value of the first parameter is updated to 4.

The difference between the charging cycle number corresponding to the fifth charging cycle satisfying the first condition and the charging cycle number corresponding to the fourth charging cycle satisfying the first condition is 8 (which is greater than the set value), the value of the first parameter is decreased by 1, and the value of the first parameter is updated to 3.

The other charging cycles are similarly defined.

For example, the difference between the charging cycle number corresponding to the ninth charging cycle satisfying the first condition and the charging cycle number corresponding to the eighth charging cycle satisfying the first condition is 2 (which is less than the set value), the value of the first parameter is increased by 1, and the value of the first parameter is updated to 9.

Finally, it is determined that the value (i.e., 9) of the first parameter is greater than the set parameter value (i.e., 8), and the second condition is satisfied.

Example 2

In this example, the product of the preset variation and the weight is used in the process of updating the first parameter. The weight is a fixed value 1.5.

The set value is 5. The initial value of the first parameter is 1. The preset variation is 1. The set parameter value is 8. In the non-floating charging mode, there are latest 9 charging cycles satisfying the first condition.

After the first charging cycles satisfying the first condition occur, the value of the first parameter is set to be 1.

The difference between the charging cycle number corresponding to the second charging cycle satisfying the first condition and the charging cycle number corresponding to the first charging cycle satisfying the first condition is 4 (which is less than the set value), the value of the first parameter is increased by the product (i.e., 1.5) of the preset variation and the weight, and the value of the first parameter is updated to 2.5.

The difference between the charging cycle number corresponding to the third charging cycle satisfying the first condition and the charging cycle number corresponding to the second charging cycle satisfying the first condition is 5 (which is equal to the set value), the value of the first parameter is increased by the product (i.e., 1.5) of the preset variation and the weight, and the value of the first parameter is updated to 4.

The difference between the charging cycle number corresponding to the fourth charging cycle satisfying the first condition and the charging cycle number corresponding to the third charging cycle satisfying the first condition is 4 (which is less than the set value), the value of the first parameter is increased by the product (i.e., 1.5) of the preset variation and the weight, and the value of the first parameter is updated to 5.5.

The difference between the charging cycle number corresponding to the fifth charging cycle satisfying the first condition and the charging cycle number corresponding to the fourth charging cycle satisfying the first condition is 8 (which is greater than the set value), the value of the first parameter is decreased by the product (i.e., 1.5) of the preset variation and the weight, and the value of the first parameter is updated to 4.

The other charging cycles are similarly defined.

For example, the difference between the charging cycle number corresponding to the ninth charging cycle satisfying the first condition and the charging cycle number corresponding to the eighth charging cycle satisfying the first condition is 2 (which is less than the set value), the value of the first parameter is increased by the product (i.e., 1.5) of the preset variation and the weight, and the value of the first parameter is updated to 10.

Finally, it is determined that the value (i.e., 10) of the first parameter is greater than the set parameter value (i.e., 8), and the second condition is satisfied.

Example 3

In Example 3, the product of the preset variation and the weight is used in the process of updating the first parameter. The weight is a variable related to the occurrence sequence number of the charging cycle satisfying the first condition, specifically the sum of 1 and the ratio of the occurrence sequence number of the charging cycle satisfying the first condition to 10.

The set value is 5. The initial value of the first parameter is 1. The preset variation is 1. The set parameter value is 8. In the non-floating charging mode, there are latest 9 charging cycles satisfying the first condition.

After the first charging cycles satisfying the first condition occur, the value of the first parameter is set to be 1.

The difference between the charging cycle number corresponding to the second charging cycle satisfying the first condition and the charging cycle number corresponding to the first charging cycle satisfying the first condition is 4 (which is less than the set value), the weight is 1.2, the update increment is 1.2, and the value of the first parameter is updated to 2.2.

The difference between the charging cycle number corresponding to the third charging cycle satisfying the first condition and the charging cycle number corresponding to the second charging cycle satisfying the first condition is 5 (which is equal to the set value), the weight is 1.3, the update increment is 1.3, and the value of the first parameter is updated to 3.5.

The difference between the charging cycle number corresponding to the fourth charging cycle satisfying the first condition and the charging cycle number corresponding to the third charging cycle satisfying the first condition is 4 (which is less than the set value), the weight is 1.4, the update increment is 1.4, and the value of the first parameter is updated to 4.9.

The difference between the charging cycle number corresponding to the fifth charging cycle satisfying the first condition and the charging cycle number corresponding to the fourth charging cycle satisfying the first condition is 8 (which is greater than the set value), the weight is 1.5, the update increment is 1.5, and the value of the first parameter is updated to 3.4.

The other charging cycles are similarly defined.

For example, the difference between the charging cycle number corresponding to the ninth charging cycle satisfying the first condition and the charging cycle number corresponding to the eighth charging cycle satisfying the first condition is 2 (which is less than the set value), the weight is 1.9, the update increment is 1.9, and the value of the first parameter is updated to 8.5.

Finally, it is determined that the value (i.e., 8.5) of the first parameter is greater than the set parameter value (i.e., 8).

Figure 2:
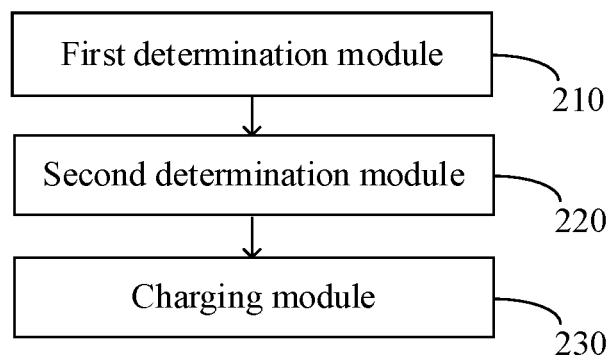
FIG. 2 is a structure diagram of a battery charging apparatus according to an exemplary embodiment.

FIG. 2 is a structure diagram of a battery charging apparatus according to an exemplary embodiment. The apparatus comprises:

a first determination module 210 configured to determine whether a first condition is satisfied, the first condition being that in a case where a battery capacity is greater than a set capacity, the duration of continuous charging is greater than a set threshold;

a second determination module 220 configured to determine whether a present charging cycle satisfies a floating charging condition when the first condition is satisfied; and a charging module 230 configured to charge using a set floating charging mode after the second determination module determines that the present charging cycle satisfies the floating charging condition.

In some embodiments, the charging module is further configured to charge using the set floating charging mode in the following approach: constant-voltage charging a battery with a first charging voltage, the first charging voltage being less than an initial constant-voltage charging voltage, the initial constant-voltage charging voltage being in a case where the floating charging condition is not satisfied.

FIG. 10 is a structure diagram of a battery charging apparatus according to an exemplary embodiment. The second determination module 220 comprises a third determination module 221; and the third determination module is configured to determine that the present charging cycle satisfies the floating charging condition in the following way: determining that the latest N charging cycles satisfying the first condition satisfy a second condition, wherein N is greater than a set number of times.

In some embodiments, the determining that the latest N charging cycles satisfying the first condition satisfy a second condition comprises:

among the latest N charging cycles satisfying the first condition, the difference between charging cycle numbers of adjacent charging cycles satisfying the first condition is less than or equal to a set value.

In some embodiments, the determining that the latest N charging cycles satisfying the first condition satisfy a second condition comprises:

the number of groups of adjacent charging cycles satisfying the first condition and satisfying a third condition is greater than the product of N−1 and a first ratio, the first ratio being greater than 0.5 and less than 1; and the third condition is that the difference between charging cycle numbers of adjacent charging cycles satisfying the first condition is less than or equal to the set value.

Figure 11:
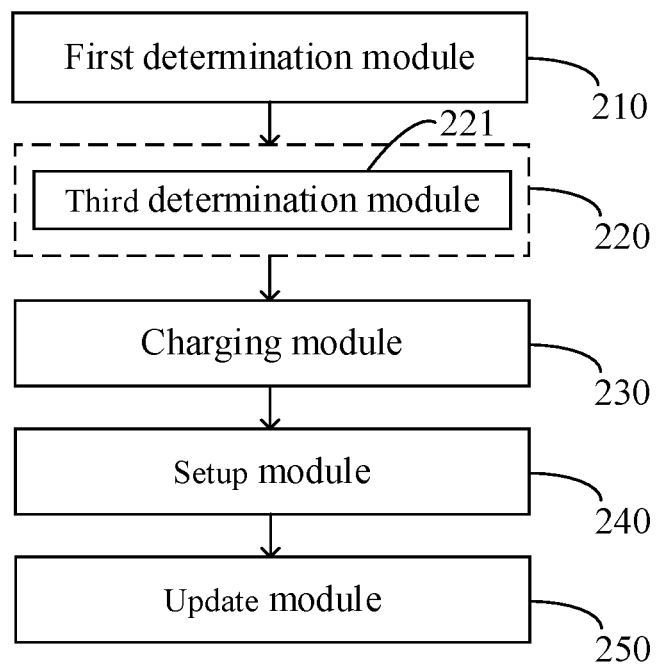
FIG. 11 is a structure diagram of a battery charging apparatus according to an exemplary embodiment.

FIG. 11 is a structure diagram of a battery charging apparatus according to an exemplary embodiment. The apparatus further comprises:

a setup module 240 configured to set a first parameter of a first charging cycle satisfying the first condition to be an initial value when the floating charging condition is not satisfied; and an update module 250 configured to update the first parameter according to the difference between charging cycle numbers of adjacent charging cycles satisfying the first condition, increase the value of the first parameter when the difference in charging cycle number is less than or equal to the set value, and set the first parameters to be a minimum value or decrease the value of the first parameter when the difference is greater than the set value; and the latest N charging cycles satisfying the first condition satisfy a second condition comprises: the value of the first parameter is greater than or equal to a set parameter value.

In some embodiments, the increasing the value of the first parameter is increasing the value of the first parameter by a preset variation; and, the decreasing the value of the first parameter is subtracting a preset variation from the value of the first parameter;

or, the increasing the value of the first parameter is increasing the value of the first parameter by a product of the preset variation and a weight; and, the decreasing the value of the first parameter is subtracting the product of the preset variation and the weight from the value of the first parameter, wherein the weight is a fixed value, or the weight is a variable related to the occurrence sequence number of the charging cycle satisfying the first condition.

Figure 3:
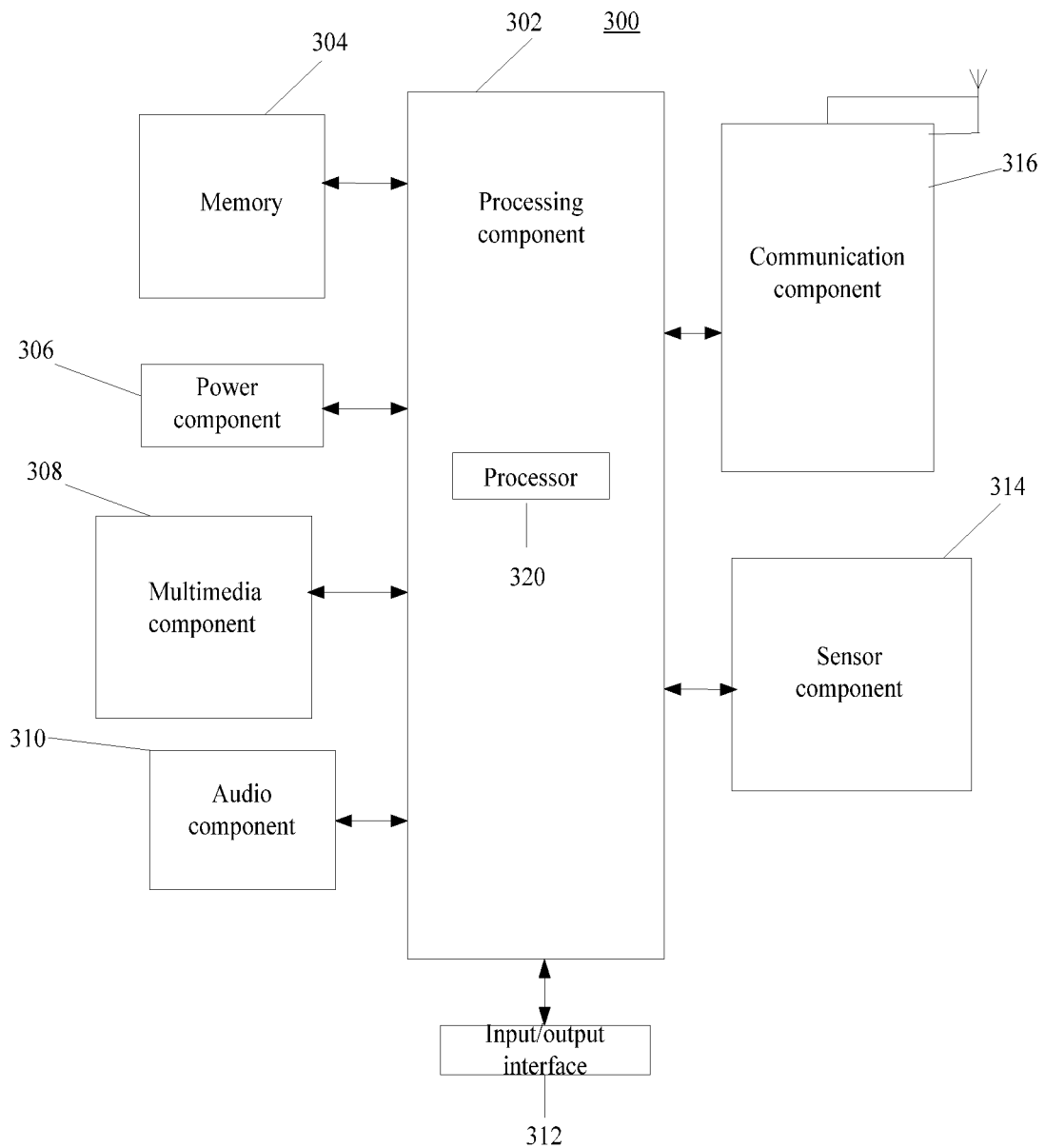
FIG. 3 is a structure diagram of a battery charging apparatus according to an exemplary embodiment.

FIG. 3 is a block diagram of an apparatus 300 for battery charging according to an exemplary embodiment. For example, the apparatus 300 may be a mobile phone, a computer, a digital broadcasting terminal, a messaging receiving and transmitting device, a game console, a tablet device, a medical device, a fitness device, a personal digital assistant or the like.

With reference to FIG. 3, the apparatus 300 may include one or more of the following components: a processing component 302, a memory 304, a power component 306, a multimedia component 308, an audio component 310, an input/output (I/O) interface 312, a sensor component 314 and a communication component 316.

The processing component 302 generally controls the overall operation of the apparatus 300, such as operations associated with display, telephone call, data communication, camera operations and recording operations. The processing component 302 may include one or more processors 320 to execute instructions to complete all or some of the steps in the method described above. Additionally, the processing component 302 may include one or more modules to facilitate interaction between the processing component 302 and other components. For example, the processing component 302 may include a multimedia module to facilitate interaction between the multimedia component 305 and the processing component 302.

The memory 304 is configured to store various types of data to support the operation of the apparatus 300. Examples of the data include instructions for any application or method operating on the apparatus 300, contact data, phonebook data, messages, pictures, video or the like. The memory 304 may be implemented by any type of volatile or non-volatile storage devices or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 306 supplies power to various components of the apparatus 300. The power component 306 may include a power management system, one or more power supplies, and other components associated with the generation, management and distribution of power for the apparatus 300.

The multimedia component 305 includes a screen to provide an output interface between the apparatus 300 and a user. In some embodiments, the screen may include a Liquid Crystal Display (LCD) and a Touch Panel (TP). In some embodiments, an organic light-emitting diode (OLED) display can be employed.

If the screen includes a TP, the screen may be implemented as a touch screen to receive input signals from the user. The touch panel includes one or more touch sensors to sense touching, sliding and gestures on the touch panel. The touch sensor may sense the boundary of a touch or slide action, and also detect the duration and pressure related to the touch or slide operation. In some embodiments, the multimedia component 305 includes a front camera and/or a rear camera. When the apparatus 300 is in an operation mode such as a shooting mode or a video mode, the front camera and/or the rear camera may receive external multimedia data. Each of the front camera and the rear camera may be a fixed optical lens system or have a focal length and an optical zooming capability.

The audio component 310 is configured to output and/or input audio signals. For example, the audio component 310 includes a microphone (MIC). When the apparatus 300 is in an operation mode such as a call mode, a recording mode or a voice recognition mode, the microphone is configured to receive external audio signals. The received audio signals may be further stored in the memory 304 or transmitted via the communication component 316. In some embodiments, the audio component 310 further includes a loudspeaker configured to output the audio signals.

The I/O interface 312 provides an interface between the processing component 302 and a peripheral interface module. The peripheral interface module may be a keyboard, a click wheel, buttons or the like. These buttons may include, but not limited to: a Home button, a Volume button, a Start button and a Lock button.

The sensor component 314 includes one or more sensors configured to provide state evaluation of various aspects of the apparatus 300. For example, the sensor component 314 may detect the on/off state of the apparatus 300 and the relative position of a component. For example, if the component is a display and a keypad of the apparatus 300, the sensor component 314 may also detect the position change of the apparatus 300 or one component of the apparatus 300, the presence or absence of the user's contact with the apparatus 300, the orientation or acceleration/deceleration of the apparatus 300 and the temperature change of the apparatus 300. The sensor component 314 may include a proximity sensor configured to detect the presence of nearby objects without any physical contact. The sensor component 314 may further include an optical sensor (e.g., a CMOS or CCD image sensor) for use in imaging applications. In some embodiments, the sensor component 314 may further include an acceleration sensor, a gyroscope sensor, a magnetic sensor, a pressure sensor or a temperature sensor.

The communication component 316 is configured to facilitate the wired or wireless communication between the apparatus 300 and other devices. The apparatus 300 may access to a wireless network based on communication standards, for example, Wi-Fi, 2G, 3G, 4G, 5G, or a combination thereof. In an exemplary embodiment, the communication component 316 receives a broadcast signal or broadcast related information from an external broadcast management system via a broadcast channel. In an exemplary embodiment, the communication component 316 further includes a Near-Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In an exemplary embodiment, the apparatus 300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements to execute the method described above.

In an exemplary embodiment, a non-transitory computer-readable storage medium including instructions is further provided, for example, the memory 304 including instructions. The instructions may be executed by the processor 320 of the apparatus 300 to complete the method described above. For example, the non-transitory computer-readable storage medium may be an ROM, a Random Access Memory (RAM), a CD-ROM, a magnetic tape, a floppy disk, an optical data storage device or the like.

Various embodiments of the present disclosure can have one or more of the following advantages.

The battery capacity during the charging process can be detected in real time. In a case where the battery capacity is greater than the set capacity, the duration of continuous charging is greater than the set threshold and the present charging cycle satisfies the floating charging condition, the floating charging mode is timely activated, such that batteries are prevented from dangerous situations such as bulging, expansion and explosion, and the safety of battery charging is improved.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A battery charging method, comprising:
   determining whether a present charging cycle satisfies a floating charging condition when a first condition is satisfied, the first condition being that in a case where battery capacity is greater than a set capacity, a duration of continuous charging is greater than a set threshold; and
   charging using a set floating charging mode after determining that the present charging cycle satisfies the floating charging condition;
   wherein the determining that the present charging cycle satisfies the floating charging condition comprises:
   determining that N latest charging cycles satisfying the first condition satisfy a second condition, wherein N is greater than a set number of times,
   wherein the second condition includes cases related to charging cycle numbers of adjacent charging cycles satisfying the first condition;
   when the floating charging condition is not satisfied, for a first charging cycle among the N latest charging cycles satisfying the first condition, setting a first parameter to be an initial value; for each of the remaining ones among the N latest charging cycles satisfying the first condition, updating the first parameter according to the difference between charging cycle numbers of adjacent charging cycles satisfying the first condition, comprising: increasing the value of the first parameter when the difference between charging cycle numbers of adjacent charging cycles is less than or equal to a set value; and, setting the first parameter to be a minimum value or decreasing the value of the first parameter when the difference between charging cycle numbers of adjacent charging cycles is greater than the set value; and
   determining that the N latest charging cycles satisfying the first condition satisfy the second condition comprises: determining a value of the first parameter is greater than or equal to a set parameter value.

2. The battery charging method according to claim 1, wherein charging using the set floating charging mode comprises:
   constant-voltage charging the battery with a first charging voltage, the first charging voltage being less than an initial constant-voltage charging voltage, the initial constant-voltage charging voltage being in a case where the floating charging condition is not satisfied.

3. The battery charging method according to claim 1, wherein
   determining that the N latest charging cycles satisfying the first condition satisfy the second condition comprises:
   a number of groups of adjacent charging cycles satisfying the first condition and satisfying a third condition is greater than the product of N−1 and a first ratio, the first ratio being greater than 0.5 and less than 1; and the third condition is that the difference between charging cycle numbers of adjacent charging cycles satisfying the first condition is less than or equal to a set value.

4. A mobile terminal implementing the battery charging method according to claim 3, wherein upon determining that the present charging cycle satisfies the floating charging condition, the mobile terminal is configured to automatically activate the floating charging mode, such that batteries are prevented from dangerous situations.

5. The mobile terminal according to claim 4, wherein
the set capacity is 90% to 98%, and the set threshold is 0.5 h to 2 h;
the battery capacity during the charging process is detected in real time; and
the floating charging mode includes: constant-voltage charging with a voltage being less than an initial constant-voltage charging voltage which is in a case where the floating charging condition is not satisfied.

6. The mobile terminal according to claim 5, wherein the mobile terminal is configured to determine that one pair of adjacent charging cycles satisfying the first condition but not satisfying the third condition is an accidental event.

7. The battery charging method according to claim 1, wherein
the increasing the value of the first parameter is increasing the value of the first parameter by a preset variation; and, the decreasing the value of the first parameter is subtracting the preset variation from the value of the first parameter.

8. The battery charging method according to claim 1, wherein
the increasing the value of the first parameter is increasing the value of the first parameter by a product of a preset variation and a weight; and, the decreasing the value of the first parameter is subtracting the product of the preset variation and the weight from the value of the first parameter, wherein the weight is a fixed value, or the weight is a variable related to the occurrence sequence number of the charging cycle satisfying the first condition.

9. A battery charging apparatus, comprising:
a processor; and
memory storing instructions executable for the processor that, when executed by the processor, causes the processor to:
determine whether a first condition is satisfied, the first condition being that in a case where a battery capacity is greater than a set capacity, the duration of continuous charging is greater than a set threshold;
determine whether a present charging cycle satisfies a floating charging condition when the first condition is satisfied; and
charge using a set floating charging mode after the second determination module determines that the present charging cycle satisfies the floating charging condition;
wherein the instructions further cause the processor to:
determine that the present charging cycle satisfies the floating charging condition in the following way: determining that N latest charging cycles satisfying the first condition satisfy a second condition, wherein N is greater than a set number of times, and wherein the second condition includes cases related to charging cycle numbers of adjacent charging cycles satisfying the first condition;

when the floating charging condition is not satisfied, for a first charging cycle among the N latest charging cycles satisfying the first condition, set a first parameter to be an initial value; and
for each of the remaining ones among the N latest charging cycles satisfying the first condition, update the first parameter according to the difference between charging cycle numbers of adjacent charging cycles satisfying the first condition, comprising: increasing the value of the first parameter when the difference between charging cycle numbers of adjacent charging cycles is less than or equal to a set value, and setting the first parameter to be a minimum value or decreasing the value of the first parameter when the difference between charging cycle numbers of adjacent charging cycles is greater than the set value;
wherein the N latest charging cycles satisfying the first condition satisfy the second condition comprises: determining a value of a first parameter is greater than or equal to a set parameter value.

10. The battery charging apparatus according to claim 9, wherein the instructions further cause the processor to:
charge using the set floating charging mode in the following way: constant-voltage charging a battery with a first charging voltage, the first charging voltage being less than an initial constant-voltage charging voltage, the initial constant-voltage charging voltage being in a case where the floating charging condition is not satisfied.

11. The battery charging apparatus according to claim 9, wherein the determining that the N latest charging cycles satisfying the first condition satisfy the second condition comprises:
a number of groups of adjacent charging cycles satisfying the first condition and satisfying a third condition is greater than the product of N−1 and a first ratio, the first ratio being greater than 0.5 and less than 1; and
the third condition is that the difference between charging cycle numbers of adjacent charging cycles satisfying the first condition is less than or equal to a set value.

12. The battery charging apparatus according to claim 9, wherein
the increasing the value of the first parameter is increasing the value of the first parameter by a preset variation; and, the decreasing the value of the first parameter is subtracting a preset variation from the value of the first parameter.

13. The battery charging apparatus according to claim 9, wherein
the increasing the value of the first parameter is increasing the value of the first parameter by a product of a preset variation and a weight; and, the decreasing the value of the first parameter is subtracting the product of the preset variation and the weight from the value of the first parameter, wherein the weight is a fixed value, or the weight is a variable related to the occurrence sequence number of the charging cycle satisfying the first condition.

14. A non-transitory computer-readable storage medium storing instructions that, when executed by a processor of a mobile terminal, enable the mobile terminal to execute a battery charging method, the method comprising operations of:
determining whether a present charging cycle satisfies a floating charging condition when a first condition is satisfied, the first condition being that in a case where battery capacity is greater than a set capacity, the duration of continuous charging is greater than a set threshold; and charging using a set floating charging mode after determining that the floating charging condition is satisfied;

wherein the determining that the present charging cycle satisfies the floating charging condition comprises:

determining that N latest charging cycles satisfying the first condition satisfy a second condition, wherein N is greater than a set number of times, wherein the second condition includes cases related to charging cycle numbers of adjacent charging cycles satisfying the first condition;

when the floating charging condition is not satisfied, for a first charging cycle satisfying the first condition, setting a first parameter to be an initial value; for each of the remaining ones among the N latest charging cycles satisfying the first condition, updating the first parameter according to the difference between charging cycle numbers of adjacent charging cycles satisfying the first condition, comprising: increasing the value of the first parameter when the difference between charging cycle numbers of adjacent charging cycles is less than or equal to a set value; and, setting the first parameter to be a minimum value or decreasing the value of the first parameter when the difference between charging cycle numbers of adjacent charging cycles is greater than the set value; and determining that the N latest charging cycles satisfying the first condition satisfy the second condition comprises: determining a value of the first parameter is greater than or equal to a set parameter value.

* * * * *